J. W. SIMPSON.
Seed-Planter.

No. 169,122. Patented Oct. 26, 1875.

WITNESSES:
Philip W. Hale,
C. J. Fritz

INVENTOR
James W. Simpson
per Wm Beale Hale,
Atty.

N. PETERS, PHOTO-LITHOGRAPHER, WASHINGTON, D.C.

UNITED STATES PATENT OFFICE.

JAMES W. SIMPSON, OF DRY RIDGE, KENTUCKY, ASSIGNOR OF ONE-HALF HIS RIGHT TO MORGAN J. SIMPSON, OF SAME PLACE.

IMPROVEMENT IN SEED-PLANTERS.

Specification forming part of Letters Patent No. 169,122, dated October 26, 1875; application filed April 6, 1875.

*To all whom it may concern:*

Figure 1:
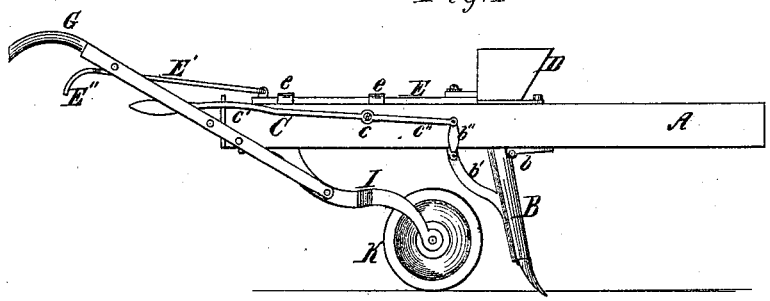
Figure 2:
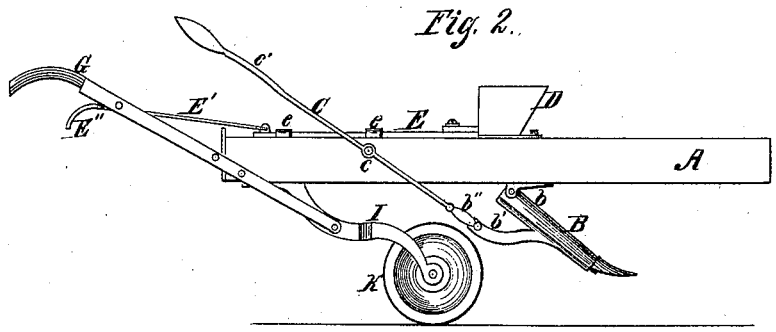
Figure 3:
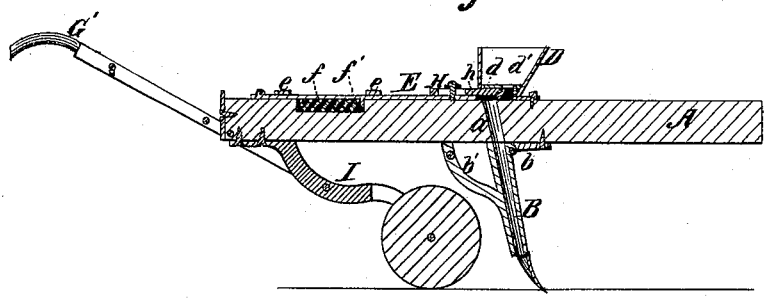
Figure 4:
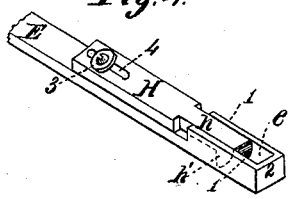

Be it known that I, JAMES W. SIMPSON, of Dry Ridge, in the county of Grant and State of Kentucky, have invented certain new and useful Improvements in Seed-Planters; and I do hereby declare that the following is a full, clear, and exact description thereof, which will enable others skilled in the art to which it pertains to make and use the same, reference being had to the accompanying drawing, and to the letters of reference marked thereon, which form a part of this specification:

Figure 1 is a side elevation of my improved planter. Fig. 2 shows the operation of the lever which controls the position of the plow. Fig. 3 is a vertical longitudinal section taken through the center of the beam, dropping devices, and hollow plow helve or standard. Fig. 4 is a perspective view of the adjustable valve or regulator of the dropping-slide.

My invention relates to improvements in the class of planters used for planting corn, cotton, and cane; and consists, first, in an adjustable seed-dropping apparatus, by means of which the quantity of seed dropped at a time may be regulated; second, in a combined plow helve or standard and seed-tube; third, in a device for raising the plow from the ground when its action is not required; and fourth, in an improved arrangement of the guiding-handles with relation to the covering-wheel, by means of which the action of said wheel may be assisted when necessary.

I will describe my improvements in detail, referring to the drawings, in the several figures of which like parts are indicated by the same letters.

A is a plow or planter beam, to the under side of which, about the middle, a hollow standard, B, is hinged, at the top of the front side thereof, as shown at $b$. To the rear side of the hollow standard B is attached a brace, $b'$, curving backward and upward, and terminating on a line with the top of said standard B and against the lower side of beam A, thus supporting the plow against the strain which is upon it while opening a furrow. At the bottom or foot of the standard may be attached a plow-iron of any desired shape or size for opening furrows. C is a lever, pivoted to the side of beam A at $c$, its long arm $c'$ extending rearward beyond the end of beam A, so as to be within easy reach of the person using the planter, and its short arm $c''$ extending forward to a point immediately above the top of brace $b'$, to which it is connected by a link, $b''$. The function of the lever C is to raise the plow from the ground when turning the planter around, when going to or from the field, or at any other time when the action of the plow is not required. The length of the arms of the lever may be proportioned so as to raise the plow to any desired position. Upon the top of beam A, directly above the standard B, is arranged a seed-hopper, D, the bottom of which is supported by the sides at a sufficient distance above the beam to permit the dropping-slide E to play between said bottom and the top of the beam. About the center of the hopper-bottom $d$ is an opening, $d'$. Immediately to the rear of this opening $d'$ is an aperture, $a$, extending through the beam A, and coinciding with the tubular passage through the standard B. The dropping-slide E plays in guides $e\ e$ on top of beam A, the fore end of said slide extending under the bottom of the hopper, and is provided with a slot, $e'$, which coincides with the opening in the bottom of the hopper, when slide E is forced forward to the limit of its movement by a spring, $f$, located in a chamber in the upper side of beam A, and acting on a lug or pin, $f'$, on the under side of the slide E. To the rear end of slide E is jointed a rod, E', which passes backward through a bearing in the cross-brace of the handles G G', and is then bent outward at a right angle and formed into a hook or handle, E'', just under the curved end of the handle G, where it is in a convenient position for the driver to operate the dropping-slide. That portion of the dropping-slide E which forms the side walls 1 1 and end wall 2 of the slot $e'$ is somewhat thicker than the remainder of the slide; consequently said walls form an upward projection on two sides and the front end of the slot $e'$. On the top of slide E, just behind the thicker portion mentioned above, is arranged a sliding valve or regulator, H, having a forward-projecting tongue, $h$, which fits between walls 1 1 of slot $e'$, and may entirely or partially occupy the space between said walls, according to the adjustment of valve or regulator H, which is secured to slide E by a clamp-screw, 3, passing through a slot, 4, in said valve. The tongue h is provided with a downward projection, h', which forms an adjustable rear wall of slot e'. By loosening the screw 3 the valve or regulator may be moved back or forth, and tightening the screw will hold it where required. To the under side of the rear end of beam A is firmly bolted a curved leg or standard, I, which inclines forward and downward, and terminates in a fork or bifurcation, within which is mounted a grooved covering-wheel, K, close behind the combined seed-tube and plow-standard B. About the middle of the leg I and to opposite sides thereof are bolted the lower ends of plow-handles or guiding-handles G G', which incline upward to the proper height in such direction that practically straight lines may be from the center of the covering-wheel through the leg or standard I and handles G G' to the tops of said handles.

The object of this arrangement is to enable the person using the planter to assist, when necessary, the action of the covering-wheel.

It often occurs that uneven preparation of the ground results in spots here and there in a field which will be covered with clods that the weight of the planter alone will not crush, and which the covering-wheel simply rolls over and is lifted away from the furrow; but with the arrangement above described, the driver, in such a case, can exert his strength through the handles G G' and leg I directly upon the axle of the covering-wheel, thus facilitating the covering of the seed when obstructed by clods or from any other cause.

In the ordinary manner of arranging the covering-wheel upon a standard or hanger, which projects directly downward from an intermediate part of the beam, this action is impossible, as in any direction which pressure may be exerted upon the handles it will result only in tilting up the fore end of the beam without increasing the force with which the covering-wheel bears upon the clods.

In using my improved planter the valve or regulator H is first adjusted so that an aperture is left of sufficient size to drop the desired quantity of seed each time the slide is pulled. The plow is raised from the ground by means of lever C, and so held until the planter has arrived at the proper place to begin work. The plow is then lowered and the lever C rests, as in Fig. 1. The seed being placed in the hopper, a proper quantity sinks into the slot e'. The horse is started and the plow opens a furrow; the rod E' is pulled, which draws back the dropping-slide and the seed in slot e', so that the seed drop through aperture a and hollow standard B into the furrow where they are covered by the grooved wheel K, which forces the earth inward from the sides of the furrow. When rod E' is released the spring f' forces the slide E forward, bringing slot e' under opening d in the bottom of the hopper, when it is again filled with seed and the operation repeated. When the end of the furrow is reached the plow is raised while turning by means of lever C.

I am aware of the patent granted to N. Breed, dated January 11, 1870, and numbered 98,663, and I make no claim to the arrangements of devices shown in said patent; but

Having now described the construction and operation of my invention, I claim and desire to secure by Letters Patent—

In a walking seed-planter, the combination of hinged standard B, brace b', link b'', and lever C, pivoted to and extending rearward along one side of beam A to a point within reach of the operator, substantially as described.

In testimony that I claim the foregoing as my own invention I affix hereto my signature in presence of two witnesses.

JAMES WM. SIMPSON.

Witnesses:
 W. W. DICKERSON,
 W. C. JOHNSON.